(12) United States Patent
Meissner

(10) Patent No.: US 8,711,367 B2
(45) Date of Patent: Apr. 29, 2014

(54) POSITION-MEASURING DEVICE

(75) Inventor: Markus Meissner, Uebersee (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 513 days.

(21) Appl. No.: 12/962,014

(22) Filed: Dec. 7, 2010

(65) Prior Publication Data

US 2011/0141480 A1 Jun. 16, 2011

Related U.S. Application Data

(60) Provisional application No. 61/286,566, filed on Dec. 15, 2009.

(30) Foreign Application Priority Data

Dec. 14, 2009 (DE) .......................... 10 2009 054 592

(51) Int. Cl.
*G01B 11/02* (2006.01)
*H01S 3/08* (2006.01)
*H01S 3/082* (2006.01)

(52) U.S. Cl.
USPC .................. 356/499; 372/92; 372/96; 372/97; 372/99; 372/102

(58) Field of Classification Search
USPC ......................................................... 356/499
See application file for complete search history.

(56) References Cited

U.S. PATENT DOCUMENTS

| | | | |
|---|---|---|---|
| 4,639,922 A * | 1/1987 | Miller | 372/19 |
| 4,754,459 A * | 6/1988 | Westbrook | 372/32 |
| 5,771,250 A * | 6/1998 | Shigehara et al. | 372/6 |
| 5,914,972 A * | 6/1999 | Siala et al. | 372/33 |
| 6,351,313 B1 | 2/2002 | Braasch et al. | |
| 6,418,251 B1 * | 7/2002 | Boscha | 385/31 |
| 6,977,368 B2 | 12/2005 | Drescher et al. | |

(Continued)

FOREIGN PATENT DOCUMENTS

| | | |
|---|---|---|
| DE | 10 2005 043 569 | 3/2007 |
| DE | 10 2006 041 357 | 5/2007 |

(Continued)

*Primary Examiner* — Tarifur Chowdhury
*Assistant Examiner* — Sunghee Y Gray
(74) *Attorney, Agent, or Firm* — Kenyon & Kenyon LLP

(57) ABSTRACT

A position-measuring device, for ascertaining the position of two objects which are disposed in a manner allowing movement relative to each other in at least one measuring direction, includes a light source, as well as a splitting device by which a light beam, provided by the light source, is split into two or more partial beams of rays. The partial beams of rays traverse at least two partial-beam paths. Interfering partial beams of rays from the partial-beam paths strike a plurality of optoelectronic detector elements, so that displacement-dependent position signals are ascertainable via the detector elements. The light source takes the form of a semiconductor laser having a fiber-grating feedback device.

39 Claims, 3 Drawing Sheets

(56) References Cited

U.S. PATENT DOCUMENTS

| | | |
|---|---|---|
| 7,389,595 B2 | 6/2008 | Meissner et al. |
| 7,542,863 B2 | 6/2009 | Drescher et al. |
| 7,573,581 B2 | 8/2009 | Holzapfel |
| 2003/0081192 A1* | 5/2003 | Nishi .............................. 355/69 |
| 2003/0210457 A1* | 11/2003 | Emori et al. ................... 359/334 |
| 2004/0131102 A1* | 7/2004 | Jette et al. ....................... 372/97 |
| 2004/0228384 A1 | 11/2004 | Oh et al. |
| 2006/0062261 A1* | 3/2006 | Farmiga et al. ................. 372/20 |
| 2007/0058173 A1 | 3/2007 | Holzapfel |
| 2007/0107247 A1* | 5/2007 | Meissner et al. ................ 33/707 |
| 2010/0208756 A1* | 8/2010 | Noh ................................ 372/20 |
| 2010/0220756 A1* | 9/2010 | Krzysztof et al. ......... 372/38.02 |

FOREIGN PATENT DOCUMENTS

| | | |
|---|---|---|
| EP | 1 019 669 | 7/2000 |
| EP | 1 334 332 | 8/2003 |
| JP | 03-154801 | 7/1991 |
| JP | 08-078787 | 3/1996 |
| JP | 2002-005614 | 1/2002 |
| JP | 2004-343043 | 12/2004 |
| JP | 2005-114512 | 4/2005 |
| JP | 2007-132932 | 5/2007 |
| JP | 2007-234916 | 9/2007 |

* cited by examiner

1

POSITION-MEASURING DEVICE

CROSS-REFERENCE TO RELATED APPLICATIONS

The present application claims priority to Application No. 10 2009 054 592.1, filed in the Federal Republic of Germany on Dec. 14, 2009, which is expressly incorporated herein in its entirety by reference thereto.

The present application claims the benefit of U.S. Provisional Patent Application No. 61/286,566, filed on Dec. 15, 2009, which is expressly incorporated herein in its entirety by reference thereto.

FIELD OF THE INVENTION

The present invention relates to a position-measuring device.

BACKGROUND INFORMATION

In devices for manufacturing semiconductor components, it is necessary to precisely determine the spatial position of certain parts which are movable relative to each other, using suitable position-measuring devices. A computer-controlled sequencing control is possible in these devices based on the position information ascertained. In certain conventional methods, the position measuring necessary to this end has been performed predominantly by a plurality of laser interferometers. In the future, it must be assumed that the accuracy requirements of the position measuring, accompanied at the same time by increasing traversing speeds of the various parts, will further increase. Given the stringent accuracy requirements then resulting, laser interferometers can no longer be used as position-measuring devices. The refractive-index fluctuations in the ambient air, even in the case of optimal air conditioning, lead to unacceptable measured-value fluctuations on the order of several nanometers (nm) in the position determination.

For this reason, alternative position-measuring devices have already been proposed for devices of this type. For example, European Published Patent Application No. 1 019 669 describes the use of optical position-measuring devices having what are termed grid gratings as a two-dimensional measuring standard. Such position-measuring devices shall also be denoted hereinafter as grating-based position-measuring devices. These systems are scarcely influenced by possible fluctuations in the refractive index of the air, and therefore allow easily reproducible position measurements.

Optical position-measuring devices having gratings as measuring standards which supply the necessary resolutions in the nanometer range are usually based on interferential scanning principles. In this connection, as a rule, a light beam from a suitable light source is split into at least two coherent partial beams of rays which subsequently act upon a plurality of gratings in the respective partial-beam paths before they are reunited and brought to interference. The position information ultimately of interest is provided by the (displacement-dependent) phase position of the two interfering partial beams of rays. The resulting path-length difference is usually approximately zero for the two partial beams of rays between splitting and reuniting in symmetrical partial-beam path variants of such systems. Therefore, a small coherence length of the light used is sufficient to ensure the desired interference on the detection side.

German Published Patent Application No. 10 2005 043 569 describes a further interferential position-measuring device which preferably has asymmetrical partial-beam paths for the two partial beams of rays. That is, because of this asymmetry, path-length differences on the order of up to several millimeters (mm) result for the partial beams of rays arriving at interference. With regard to the necessary coherence length of the light used, this means that the coherence length must lie in the range of several millimeters (mm) up to several centimeters (cm); otherwise, no interference of the partial beams of rays coming to superimposition is possible. A light source which basically satisfies the demands discussed above in an extremely precise position-measuring device is described in German Published Patent Application No. 10 2006 041 357. It takes the form of a semiconductor laser having a great coherence length in the range between 1 mm and 1 cm, which functions in pulsed fashion in a single-mode operation. For instance, what are termed DFB (distributed feedback) semiconductor lasers or else DBR (distributed Bragg reflector) semiconductor lasers are considered as suitable semiconductor lasers. In general, the described light sources satisfy the demands with respect to the coherence length, however, require a certain degree of technical complexity, especially if high optical powers are needed.

Incidentally, in principle, similar demands on the light source also result if the position-measuring device is in the form of an interferometer which is operated in pulsed fashion.

SUMMARY

Example embodiments of the present invention provide a position-measuring device for extremely precise position measurements, in which the simplest possible light source that allows a pulsed operation are used.

The position-measuring device according to an example embodiment of the present invention for ascertaining the position of two objects, which are disposed in a manner allowing movement relative to each other in at least one measuring direction, includes a light source as well as splitter device by which a light beam, provided by the light source, is split into two or more partial beams of rays. The partial beams of rays traverse at least two partial-beam paths. Interfering partial beams of rays from the partial-beam paths impinge upon a plurality of opto-electronic detector elements, so that displacement-dependent position signals are ascertainable via the detector elements. The light source takes the form of a semiconductor laser having fiber-grating feedback device.

The semiconductor laser may take the form of a Fabry-Perot laser.

The fiber-grating feedback device may include the following components: a coupling-in lens system mounted in front of the front facet of the semiconductor laser on the coupling-out side; an optical fiber downstream of the coupling-in lens system; and a reflection Bragg grating integrated in the optical fiber.

The reflection characteristic of the fiber-grating feedback device may be adjusted in terms of wavelength to the mode spacing of the semiconductor laser.

In this context, radiation which is in a wavelength range that is selected to be smaller than the spacing between adjacent modes of the semiconductor laser may be reflected back by the fiber-grating feedback device into the semiconductor laser.

It may be provided to couple the semiconductor laser and the fiber-grating feedback device at least partially to a temperature-setting device, which adjusts the reflection characteristic of the fiber-grating feedback device to the position of the modes of the semiconductor laser.

The semiconductor laser and the fiber-grating feedback device may be coupled at least partially to a temperature-setting device, via which the semiconductor laser and the fiber-grating feedback device are operable at temperatures at which the phase jitter of the displacement-dependent position signals is minimized.

For example, the temperature-setting device may include a tempering element as well as a temperature-regulating device.

The optical fiber may take the form of a single-mode optical fiber.

The semiconductor laser may have a coherence length in the range of, for example, 8 to 12 mm.

In this context, the semiconductor laser is able to supply light pulses having pulse durations in the range of, for example, 20 ns to 200 ns.

It is possible for the partial-beam paths to be formed asymmetrically with different optical path lengths that are traversed by partial beams of rays before the partial beams of rays, superimposed, come to interference.

A scanning unit may be provided which is movable relative to a measuring standard, the light source being disposed remotely from the scanning unit, and the light source being connected to the scanning unit by an optical fiber.

Alternatively, however, it is also possible for the position-measuring device to take the form of an interferometer.

A number of advantages result for the position-measuring device described herein due to the light source provided.

Thus, particularly great coherence lengths up to more than one centimeter are available, accompanied at the same time by high power of the light source. This has advantageous consequences for the interferential scanning principle of the position-measuring device, since markedly greater path differences are possible for the partial beams of rays coming to interference. Thus, the permissible path differences may lie in the range of a few millimeters up to one centimeter. In particular, this allows position-measuring devices to have highly asymmetrical partial-beam paths, in which the light in the different partial-beam paths traverses markedly different optical path lengths. A greater acceptable path difference in the partial-beam paths also takes effect advantageously with regard to tilting tolerances. Thus, considerably greater tilting tolerances are acceptable for position-measuring devices arranged as described herein than in conventional devices.

As a further advantage, it should be mentioned that high wavelength stability of the light source results, with only low expenditure for temperature stabilization. Thus, position-measuring devices using scanning principles that are strongly wavelength-dependent are also able to be operated stably over longer periods of time. In particular, if the position-measuring device as described herein is in the form of an interferometer, high measuring accuracies may be attained in determining position.

In addition, due to the pulsed operation of the light source accompanied at the same time by high performance, measuring inaccuracies which may be caused by a so-called storage jitter, for instance, are avoidable. This should be understood as the inaccuracy which results because of the time between the measurement and the output of the actual measured position value. European Patent No. 1 334 332, which is expressly incorporated herein in its entirety by reference thereto, describes pulsed operation of position-measuring devices.

Further features and aspects of example embodiments of the present invention are described in more detail below with reference to the appended Figures.

DETAILED DESCRIPTION

Figure 1:
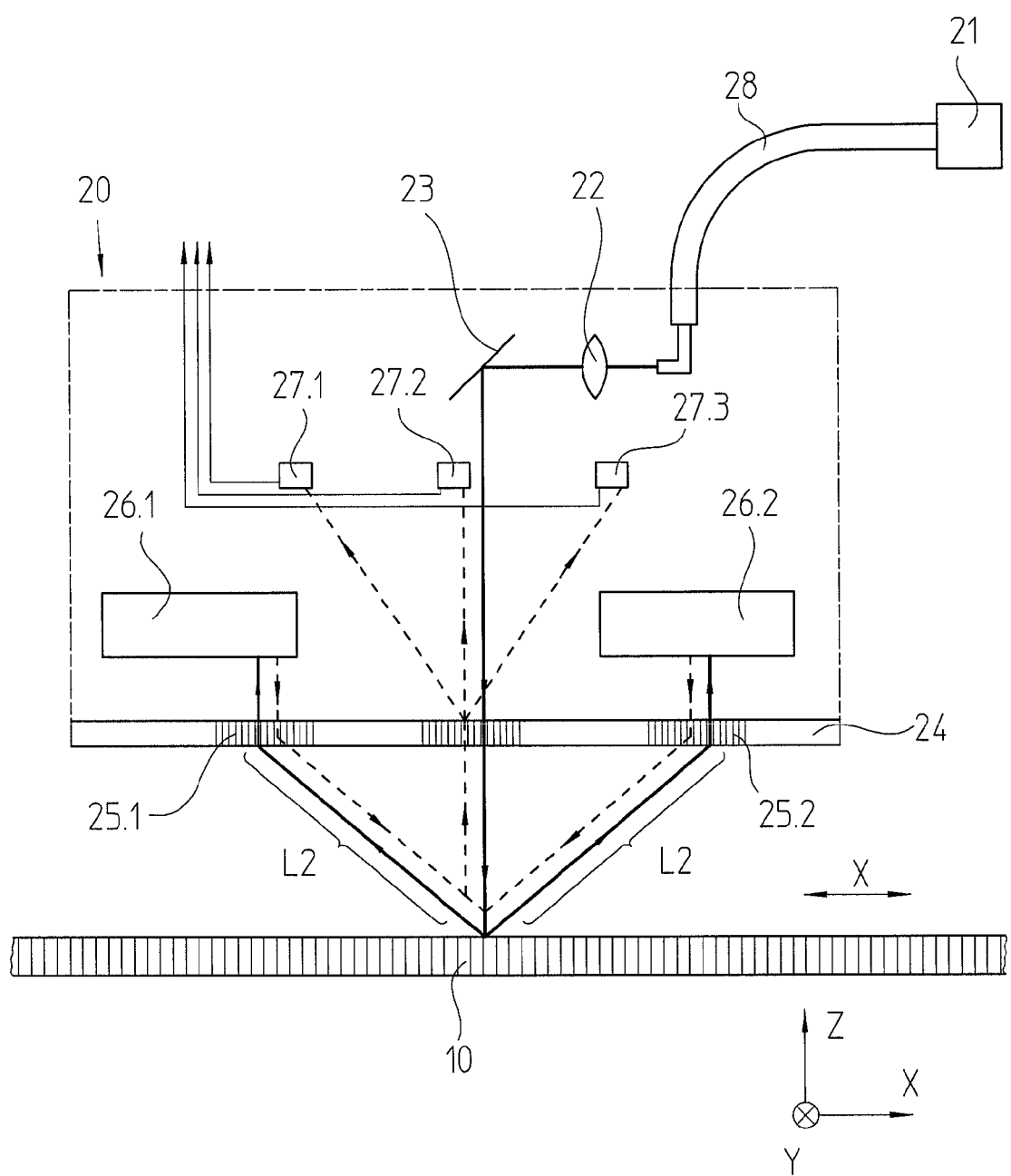
FIG. 1 schematically illustrates a position measuring device according to an example embodiment of the present invention.

FIG. 1 schematically illustrates a position-measuring device according to an example embodiment of the present invention which has a measuring standard in the form of a grating. This exemplary embodiment is therefore constructed as a grating-based position-measuring device.

In addition to measuring standard 10, the position-measuring device includes a scanning unit 20, movable at least relatively in measuring direction x, as well as a light source 21 disposed remotely from scanning unit 20. Measuring standard 10 and scanning unit 20 are connected to two objects, whose positions are to be determined relative to each other. For example, as explained at the outset, they may be components, movable relative to each other, of a device for manufacturing semiconductor components.

In the present example, measuring standard 10 takes the form of a linear reflection measuring standard, and includes regions of different reflectivity alternating in measuring direction x.

The elements on the scanning side for generating displacement-dependent position signals are also denoted hereinafter as a scanning devices. In addition to light source 21, they also include various other optical and/or opto-electronic components. For example, these components may be disposed in scanning unit 20, and/or else be suitably operatively connected to it, e.g., via suitable optical fibers, etc. To explain the functionality of the scanning devices, in the following, the scanning-beam path of the exemplary embodiment shown in FIG. 1 shall be analyzed. It should be pointed out that alternative scanning-beam paths may, of course, also be provided.

In the example of FIG. 1, the beams of rays emitted in the form of light pulses by light source 21 are supplied to scanning unit 20 via an optical fiber 28. Reference is made to the following description with regard to details of particularly suitable light sources. The light pulses or beams of rays arrive, via an outcoupling lens 22, at a deflection mirror 23 which deflects them in the direction of measuring standard 10. The beams of rays then propagate through a transparent region of a scanning plate 24 on the bottom side of scanning unit 20 in the direction of measuring standard 10. There, upon striking the first time, they are diffracted or split into two partial beams of rays of +1 and −1 order and are reflected back in the direction of scanning unit 20. Thus, in the present exemplary embodiment, measuring standard 10 acts as a splitter device by which the beam of light provided by light source 21 is split into two or more partial beams of rays. The split partial beams of rays then pass through first scanning gratings 25.1, 25.2 in scanning plate 24 in their respective partial-beam paths and are deflected back again via downstream retroreflection elements 26.1, 26.2 in the direction of measuring standard 10. The deflected partial beams of rays are indicated by a dotted line in the FIG. 1. For example, suitable prisms, deflection-mirror combinations, etc., act as retroreflection elements 26.1, 26.2. After again passing through second scanning gratings—not shown in FIG. 1—in scanning plate 24 and the directional deflection resulting in so doing, the partial beams of rays strike measuring standard 10 a second time. It should be pointed out that the illustration of the redirected partial beams of rays is indicated only schematically in FIG. 1, that is, in particular, the impingement on measuring standard 10 again is not portrayed precisely. At measuring standard 10, the partial beams of rays are diffracted once more such that a pair of parallel partial beams of rays propagates in the direction of scanning unit 20. In scanning unit 20, the partial beams of rays strike a further scanning grating 25.3 on scanning plate 24, where they are split into three pairs of interfering partial beams of rays in three spatial directions. Disposed in scanning unit 20 in the corresponding spatial directions are three detector elements 27.1, 27.2, 27.3, on which the interfering partial beams of rays from the partial-beam paths strike, so that displacement-dependent position signals are ascertainable via detector elements 27.1, 27.2, 27.3. Phase-shifted position signals are thereby present at detector elements 27.1, 27.2, 27.3. The phase shift in this case is typically 120°.

As an alternative to the configuration of detector elements 27.1 to 27.3 in scanning unit 20, it is possible to arrange them in a manner similar to light source 21 and spatially separate from it, and to route the partial beams of rays to be detected to the detector elements via optical fibers. In the same manner, as an alternative to the variant explained, it is possible to generate a different number of phase-shifted position signals, e.g., two or four position signals, in each case phase-shifted by 90°.

In the present exemplary embodiment of the position-measuring device, between the first and second reflection at measuring standard 10, the partial beams of rays traverse markedly different optical path lengths L1 and L2, i.e., L1≠L2 in the respective partial-beam paths. This is indicated only in roughly schematized fashion in FIG. 1. Thus, asymmetrical partial-beam paths having considerably different optical path lengths exist for the partial beams of rays then reaching interference. Because of this asymmetry, the demands discussed above result with respect to a great coherence length of light source 21 used, if an interference signal is to be evaluated on the detection side to determine position.

Before the light source of the position-measuring device is discussed in detail with reference to FIGS. 3 and 4, another example embodiment of a position-measuring device according is described with reference to FIG. 2. FIG. 2 again shows only a highly schematized representation of the corresponding position-measuring device. The exemplary embodiment shown in FIG. 2 is also in the form of a grating-based position-measuring device having a measuring standard.

FIG. 2 again shows a scanning unit 200, which is disposed in a manner allowing movement in at least one measuring direction X relative to measuring standard 100. The light pulses emitted by a light source 201 are again supplied to scanning unit 200 via an optical fiber 208.

Figure 2:
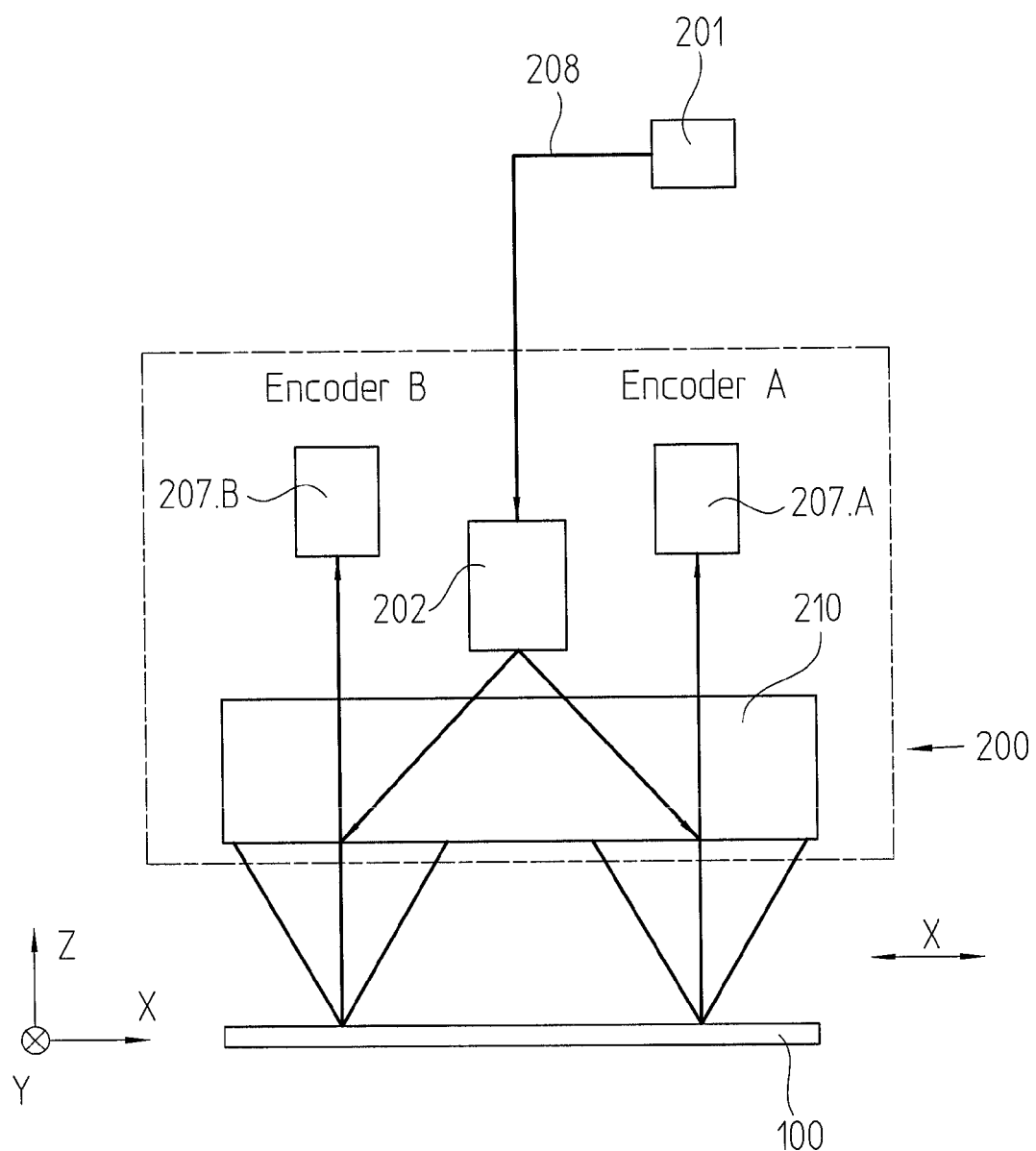
FIG. 2 schematically illustrates a position measuring device according to an example embodiment of the present invention.

In contrast to the arrangement in FIG. 1, the example embodiment shown in FIG. 2 permits not only the detection of the relative movement in indicated measuring direction x, but moreover, a simultaneous position determination in direction z perpendicular to it, as well. Consequently, in addition, the distance between measuring standard 100 and scanning unit 200 may be determined.

For this purpose, as indicated schematically in FIG. 2, scanning unit 200 includes two scanning-beam paths of the type as explained in the discussion of FIG. 1. In FIG. 2, the two scanning-beam paths are provided with the designations ENCODER A and ENCODER B. Consequently, in principle, each of the two scanning-beam paths is formed like the scanning-beam path from the example in FIG. 1. Especially with regard to optical path lengths L1, L2 traversed in the split partial-beam paths, it holds true that in each case, they are considerably different, that is, L1<L2 again applies.

The light pulse provided on the incoming side from a light source 201 disposed separately from scanning unit 200 is supplied via an optical fiber 208 to scanning unit 200 and is divided via a splitting lens system 202 into the two scanning-beam paths. Details of the two scanning-beam paths are not shown for reasons of clarity. The optical components regarded as scanning device are indicated in substantially schematized form as block 210 in scanning unit 200 in FIG. 2. Opto-electronic detector elements 207.A, 207.B, also to be regarded as scanning devices, are only indicated as blocks. The position signals determined via these detector elements 207.A, 207.B are then supplied to an evaluation unit for further processing.

At this point, reference is also made specifically to German Published Patent Application No. 10 2005 043 569 and U.S. Patent Application Publication No. 2007/0058173, each of which is expressly incorporated herein in its entirety by reference thereto, with regard to details concerning the scanning-beam paths.

Also used in the position-measuring device illustrated in FIG. 2 is a specially selected light source which offers special advantages for high-precision measurements and is explained in detail hereinafter with reference to FIGS. 3 and 4.

The two exemplary embodiments of position-measuring devices explained above in each case included gratings as physically-formed measuring standards which are disposed in the scanning-beam path. In each instance, the generating of the displacement-dependent position signals is based on interferential scanning principles. In this context, the light beam supplied by the light source is split via splitting devices into at least two partial beams of rays which subsequently act upon one or more gratings in their partial-beam paths before they are reunited and brought to interference. The position information of interest is given by the displacement-dependent phase position of the interfering partial beams of rays.

In another example embodiment of the position-measuring device, it may also be provided for it to take the form of a laser interferometer that includes no gratings as physically-formed measuring standard. In this case, the partial beams of rays, again suitably split via a splitting device, e.g., in a conventional manner traverse partial-beam paths in the form of a measuring-beam path and a reference-beam path. As a rule, the movable object is connected to a reflector element in the measuring-beam path, while a stationary reflector element is disposed in the reference-beam path. After traversing the partial-beam paths, or more precisely, the measuring-beam path and reference-beam path, the partial beams of rays are then brought to interference and displacement-dependent position signals are generated by opto-electronic detector elements. Analogous to the exemplary embodiments described in detail above having physically-formed measuring standards, in the case of a laser interferometer, the position information also results from the displacement-dependent phase position of the superimposed partial beams of rays again brought to interference. A light source as described in detail below with reference to FIGS. 3 and 4 may be employed in such a position-measuring device, as well.

Thus, it is provided to use a semiconductor laser having a fiber-grating feedback device as light source 21 in the position-measuring device. Light source 21 operates in pulsed fashion in a single-mode operation and supplies radiation having a great coherence length. Pulse durations between 20 nsec and 200 nsec with pulse powers greater than 300 mW and coherence lengths of more than 12 mm may be attained. Typical values for the coherence length of light source 21 are approximately 10 mm at approximately 500 mW pulse power. Preferably, the semiconductor laser has a coherence length in the range of 8 to 10 mm. If the pulse power is reduced further, and at the same time, the pulse duration is increased, then the coherence length may be increased even further.

Thus, even in the case of highly asymmetrical partial scanning-beam paths as in the two examples described above, an interference of the two partial beams of rays may be ensured, which after the second diffraction and recombination at the measuring standard, propagate in parallel in the direction of the detector elements.

Furthermore, the specific measuring task may call for the use of a pulsed scanning method as described, for example, in European Patent No. 1 334 332, which is expressly incorporated herein in its entirety by reference thereto. In this manner, the scanning instant is determined solely by the light pulse, that is, the storage jitter already mentioned above and the measuring inaccuracies resulting therefrom in determining position may be avoided or at least minimized when using pulsed scanning methods.

Figure 3:
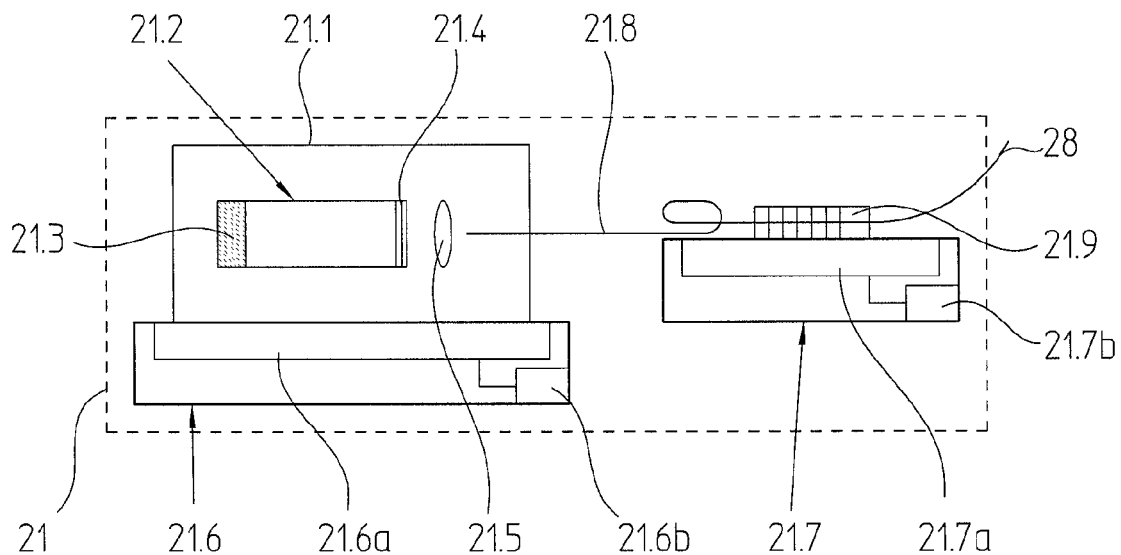
FIG. 3 schematically illustrates a light source for the position-measuring device.
Figure 4:
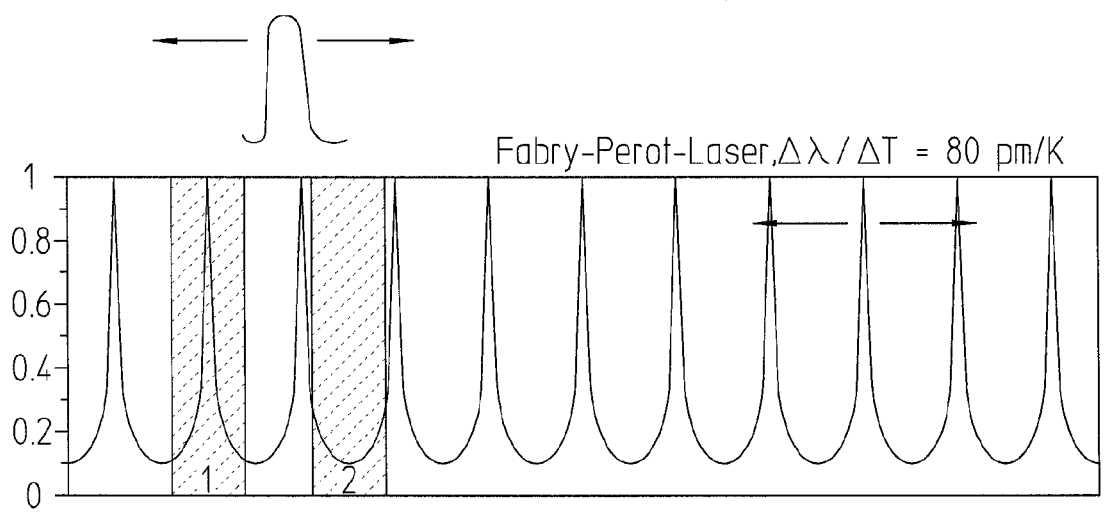
FIG. 4 schematically illustrates a mode profile of a Fabry-Perot laser and the reflection characteristic of the reflection Bragg grating of the light source illustrated in FIG. 3.

Semiconductor laser 21.2 provided for light source 21 may take the form of a Fabry-Perot laser which is arranged in a suitable laser housing 21.1—as schematically illustrated in FIG. 3. Fabry-Perot laser 21.2 includes the actual laser medium in the form of a suitable semiconductor material, as well as a highly-reflecting end facet 21.3 (R≈99%) and a non-reflecting front facet 21.4 (R≈<0.1%). The two end faces or facets of Fabry-Perot laser 21.2 therefore form a Fabry-Perot resonator and bring about the excitation of a plurality of possible laser modes. The laser radiation emitted by Fabry-Perot laser 21.2 is coupled into an optical fiber 21.8 by a coupling-in lens system 21.5 mounted in front of front facet 21.4 on the coupling-out side. Integrated in optical fiber 21.8 is a reflection Bragg grating 21.9 which reflects radiation back in the direction of Fabry-Perot laser 21.2 only in a specific wavelength range. Therefore, included in the fiber-grating feedback device on the part of light source 21 mentioned above are coupling-in lens system 21.5, optical fiber 21.8 and reflection Bragg grating 21.9. The radiation generated by light source 21 is supplied via optical fiber 28 to the scanning unit of the position-measuring device, as was already indicated in FIG. 1, as well.

Thus, light source 21 includes two coupled laser resonators, namely, an internal and an external laser resonator. The internal laser resonator or Fabry-Perot resonator is formed by end facet 21.3 and front facet 21.4. The external laser resonator is formed by end facet 21.3 and reflection Bragg grating 21.9.

Reflection Bragg grating 21.9 is formed such that it reflects radiation back to Fabry-Perot laser 21.2 only in a narrow wavelength range. The reflection characteristic of reflection Bragg grating 21.9 and therefore of the fiber-grating feedback device is adjusted in terms of wavelength to the mode spacing of Fabry-Perot laser 21.2. This ensures that only radiation which lies in a wavelength range that is smaller than the spacing of adjacent modes of Fabry-Perot laser 21.2 is reflected back by the fiber-grating feedback device into Fabry-Perot laser 21.2. This correlation is illustrated with reference to FIG. 4. There, the resulting mode spectrum of Fabry-Perot laser 21.2 used, as well as the reflection characteristic or the reflection bandwidth of reflection Bragg grating 21.9, is represented in highly schematized fashion over a specific wavelength range.

Because of this adjustment of the reflection characteristic of reflection Bragg grating 21.9 to the mode spacing of Fabry-Perot laser 21.2, the light source of the position-measuring device is able to be operated in pulsed fashion such that a position measurement is possible with only slight phase jitter.

By reflection Bragg grating 21.9, the internal laser resonator is constantly compelled to an operation in a fixed laser mode that exists stably within a few nanoseconds. In this context, the light source operates in single-mode operation. Due to the selected reflection characteristic or the reflection bandwidth of reflection Bragg grating 21.9 in the range of a few picometers, light source 21 of the position-measuring device thus emits in a very narrow spectral range (spectral width 100 pm, given an emitted wavelength of 1 µm and a coherence length of 10 mm), that is, the coherence length of light source 21 is therefore relatively great, as desired for the present application. In this manner—as already mentioned above—coherence lengths of more than 10 mm may be achieved.

As likewise already mentioned above, for a highly precise position measurement with measuring accuracies in the nanometer range, it is necessary that there be only a small phase jitter. Otherwise, the existing phase jitter would be translated into a position jitter, and therefore the accuracy of the position measurement would be affected undesirably. By reflection Bragg grating 21.9 and its reflection characteristic, it is possible to specifically select operating states of the semiconductor laser which do not correspond to an intrinsic mode of the free-running semiconductor laser without reflection Bragg grating 21.9. In these intrinsic modes, there would be a high phase jitter. Such a—suboptimal—region 2 is marked with shading in FIG. 4. However, the phase jitter may be reduced in controlled manner if an intrinsic mode of the free-running semiconductor laser is cut out selectively with the aid of reflection Bragg grating 21.9, as indicated in shaded region 1 in FIG. 4. Thus, the semiconductor laser is forced into a single-mode operation by reflection Bragg grating 21.9. Therefore, for use in the position-measuring device, the wavelength-wise position of the laser modes of the semiconductor laser utilized should be adjusted in targeted fashion to the reflection maximum of reflection Bragg grating 21.9. Because of the temperature dependence of the wavelength-wise position of the laser modes and of the reflection characteristic of reflection Bragg grating 21.9, this adjustment is accomplished with the aid of temperature-setting devices 21.6, 21.7, with which semiconductor laser 21.2 and/or the fiber-grating feedback device is/are coupled or are connected. In FIG. 3, these temperature-setting devices 21.6, 21.7 are merely indicated in highly schematized fashion, in the example shown, a temperature-setting device 21.6, 21.7 being assigned both to semiconductor laser 21.2 and to the fiber-grating feedback device so as to be in operative connection. On the part of the fiber-grating feedback device, temperature-setting devices 21.6, 21.7 provided must act at least on reflection Bragg grating 21.9 so as, in particular, to suitably adjust its reflection characteristic.

In the present example, temperature-setting devices 21.6, 21.7 each include a tempering element 21.6a, 21.7a in the form of a Peltier element, as well as a temperature-regulating device 21.6b, 21.7b which, in a conventional manner, may be implemented in software and/or hardware.

As an alternative, tempering elements 21.6a, 21.7a may also be arranged as heating elements, e.g., in the form of a heating foil, or as controllable water cooling or water heating.

Moreover, it may also be provided to set the two tempering elements 21.6a, 21.7a in suitably targeted fashion with the aid of a single temperature-regulating device, or else to provide a single, jointly-used tempering element that is suitably set via a temperature-regulating device.

For example, the temperature of the semiconductor laser is set by a suitable tempering element in the range between, e.g., 20° C. and 40° C. with a stability of 25 mK, for which, as a rule, it is necessary to heat the semiconductor laser. The temperature of reflection Bragg grating 21.9 is set to approximately 22° C., which is accomplished, for example, by a tempering element in the form of a suitable water cooling.

Prior to the actual measuring operation of the position-measuring device, it is necessary to set the optimal operating point of light source 21, i.e., of the semiconductor laser, at which the phase jitter is minimized. Various procedures are available for this purpose.

For example, the temperature of the fiber-grating feedback device may be held constant with a predefined stability by temperature-setting device 21.7. The temperature of the semiconductor laser is varied by temperature-setting device 21.6, and at the same time, the phase jitter thereby resulting is measured. The phase-jitter minimum and the associated temperature necessary for the semiconductor laser are then ascertained from the measured values. Because of the temperature coefficients of the semiconductor laser and fiber-grating feedback device—differing, e.g., by a factor 10—relative to the wavelength, only a small temperature range (e.g., 1 to 2K) of a few Kelvin needs to be tested when using this procedure, in order to set the optimal operating point.

On the other hand, as an alternative, the temperature of the semiconductor laser is held constant with a specific stability by temperature-setting device 21.6, and the temperature of the fiber-grating feedback device is varied by temperature-setting device 21.7. At the same time, the phase jitter thereby resulting is again measured, and its minimum and the associated temperature of the fiber-grating feedback device are determined. In this case, a considerably greater temperature range must be tested than before, typically 6 to 10 K, for example.

The respective temperature range to be tested in both methods is primarily a function of the length of the internal laser resonator. The longer it is, the closer together the laser modes and the smaller the temperature range to be tested.

After the phase-jitter minima have been measured, the semiconductor laser together with the phase-grating feedback device are regulated to the pair of temperatures identified as optimum in the measurement. The temperature measurement described may be carried out when manufacturing the position-measuring device, upon initialization of the machine and/or in regular calibration cycles.

In order to measure the phase-jitter minimum in a machine, the position-measuring device employed there must be used for signal generation and evaluation. Since the phase jitter is relevant especially in the case of position-measuring devices having an asymmetrical beam path, in this manner the phase-jitter minimum may also be ascertained elegantly with relatively simple arrangements. Thus, in so doing, the position-measuring device having an asymmetrical beam path is moved to the limits of its tolerance range at which the asymmetry between the partial-beam paths is at its maximum. In this position, the phase-jitter is ascertained as a function of the temperatures of the fiber-grating feedback device or of the semiconductor laser. That is to say, as explained above, one temperature is varied and the other is held constant with a definite precision. From the data ascertained, the optimal operating temperature for the semiconductor laser or the fiber-grating feedback device may now be determined and transmitted to the temperature-regulating device(s).

Therefore, the advantages already discussed above for an extremely precise position measurement result, in particular, due to the various measures on the part of the light source of the position-measuring device.

Thus, in arranging position-measuring devices operated in pulsed fashion, one is no longer restricted to highly symmetrical scanning-beam paths. Rather, asymmetrical scanning-beam paths are possible, as well.

In addition, the larger permissible path-length difference for the interfering partial beams of rays may be used for an expanded tolerance range, since due to a possible tilting of the measuring standard and scanning unit of the position-measuring device, the two interfering partial beams of rays likewise traverse different optical path lengths. Given the use of the light sources mentioned above, the possibility now presents itself, for example, to permit greater tilting tolerances when employing interferential position-measuring devices than has been conventional.

In addition to the examples described, there are a number of further possibilities.

Thus, for instance, in the case of grating-based position-measuring devices, alternative scanning-beam paths may also be provided before the partial beams of rays from the various partial-beam paths are brought, superimposed, to interference.

Both gratings as well as other optical elements in the beam path may act as splitting devices for splitting the light beam, supplied by the light source, into at least two partial beams of rays.

It has already been mentioned several times that the position-measuring device may, of course, also be arranged without a physically-formed measuring standard, namely, as an interferometer.

What is claimed is:

1. A position-measuring device for ascertaining a position of two objects which are disposed in a manner allowing movement relative to each other in at least one measuring direction, comprising:
    a light source;
    a splitter device, by which a light beam, provided by the light source, is split into at least two partial beams of rays;
    at least two partial-beam paths traversed by the partial beams of rays; and
    a plurality of opto-electronic detector elements arranged to receive interfering partial beams of rays from the partial-beam paths, displacement-dependent position signals ascertainable via the detector elements;
    wherein the light source includes a semiconductor laser having fiber-grating a feedback device to operate the light source in pulsed manner; and
    wherein the semiconductor laser and the fiber-grating feedback device are coupled at least partially to a temperature-setting device adapted to operate the semiconductor laser and the fiber-grating feedback device at temperatures at which a phase jitter of the displacement-dependent position signals is minimized.

2. The position-measuring device according to claim 1, wherein the semiconductor laser includes a Fabry-Perot laser.

3. The position-measuring device according to claim 1, wherein the fiber-grating feedback device includes:
    a coupling-in lens system mounted in front of a front facet of the semiconductor laser on a coupling-out side;
    an optical fiber downstream of the coupling-in lens system; and a reflection Bragg grating integrated in the optical fiber.

4. The position-measuring device according to claim 3, wherein the optical fiber includes a single-mode optical fiber.

5. The position-measuring device according to claim 1, wherein a reflection characteristic of the fiber-grating feedback device is adjusted, in terms of wavelength, to a mode spacing of the semiconductor laser.

6. The position-measuring device according to claim 5, wherein fiber-grating feedback device is adapted to reflect back into the semiconductor laser radiation in a wavelength range selected to be smaller than a spacing between adjacent modes of the semiconductor laser.

7. The position-measuring device according to claim 6, wherein the semiconductor laser includes a Fabry-Perot laser.

8. The position-measuring device according to claim 6, wherein the fiber-grating feedback device includes:
    a coupling-in lens system mounted in front of a front facet of the semiconductor laser on a coupling-out side;
    an optical fiber downstream of the coupling-in lens system; and
    a reflection Bragg grating integrated in the optical fiber.

9. The position-measuring device according to claim 8, wherein the optical fiber includes a single-mode optical fiber.

10. The position-measuring device according to claim 6, wherein at least one of (a) the semiconductor laser and (b) the fiber-grating feedback device is coupled at least partially to a temperature-setting device adapted to adjust the reflection characteristic of the fiber-grating feedback device to the position of the modes of the semiconductor laser.

11. The position-measuring device according to claim 10, wherein the temperature-setting device includes a tempering element and a temperature-regulating device.

12. The position-measuring device according to claim 6, wherein the semiconductor laser and the fiber-grating feedback device are coupled at least partially to a temperature-setting device adapted to operate the semiconductor laser and the fiber-grating feedback device at temperatures at which a phase jitter of the displacement-dependent position signals is minimized.

13. The position-measuring device according to claim 12, wherein the temperature-setting device includes a tempering element and a temperature-regulating device.

14. The position-measuring device according to claim 6, wherein the semiconductor laser has a coherence length between 8 and 12 mm.

15. The position-measuring device according to claim 6, wherein the semiconductor laser is adapted to supply light pulses having pulse durations between 20 ns and 200 ns.

16. The position-measuring device according to claim 15, further comprising a scanning unit movable relative to a measuring standard, the light source being arranged remotely from the scanning unit, the light source connected to the scanning unit by an optical fiber.

17. The position-measuring device according to claim 6, wherein the partial-beam paths are arranged asymmetrically with different optical path lengths which are traversed by partial beams of rays before the partial beams of rays, superimposed, come to interference.

18. The position-measuring device according to claim 6, wherein the position-measuring device is arranged as an interferometer.

19. The position-measuring device according to claim 5, wherein at least one of (a) the semiconductor laser and (b) the fiber-grating feedback device is coupled at least partially to a temperature-setting device adapted to adjust the reflection characteristic of the fiber-grating feedback device to the position of the modes of the semiconductor laser.

20. The position-measuring device according to claim 19, wherein the temperature-setting device includes a tempering element and a temperature-regulating device.

21. The position-measuring device according to claim 5, wherein the semiconductor laser includes a Fabry-Perot laser.

22. The position-measuring device according to claim 5, wherein the fiber-grating feedback device includes:
    a coupling-in lens system mounted in front of a front facet of the semiconductor laser on a coupling-out side;
    an optical fiber downstream of the coupling-in lens system; and
    a reflection Bragg grating integrated in the optical fiber.

23. The position-measuring device according to claim 22, wherein the optical fiber includes a single-mode optical fiber.

24. The position-measuring device according to claim 5, wherein the semiconductor laser and the fiber-grating feedback device are coupled at least partially to a temperature-setting device adapted to operate the semiconductor laser and the fiber-grating feedback device at temperatures at which a phase jitter of the displacement-dependent position signals is minimized.

25. The position-measuring device according to claim 24, wherein the temperature-setting device includes a tempering element and a temperature-regulating device.

26. The position-measuring device according to claim 5, wherein the semiconductor laser has a coherence length between 8 and 12 mm.

27. The position-measuring device according to claim 5, wherein the semiconductor laser is adapted to supply light pulses having pulse durations between 20 ns and 200 ns.

28. The position-measuring device according to claim 27, further comprising a scanning unit movable relative to a measuring standard, the light source being arranged remotely from the scanning unit, the light source connected to the scanning unit by an optical fiber.

29. The position-measuring device according to claim 5, wherein the partial-beam paths are arranged asymmetrically with different optical path lengths which are traversed by partial beams of rays before the partial beams of rays, superimposed, come to interference.

30. The position-measuring device according to claim 5, wherein the position-measuring device is arranged as an interferometer.

31. The position-measuring device according to claim 1, wherein the temperature-setting device includes a tempering element and a temperature-regulating device.

32. The position-measuring device according to claim 1, wherein the semiconductor laser has a coherence length between 8 and 12 mm.

33. The position-measuring device according to claim 1, wherein the semiconductor laser is adapted to supply light pulses having pulse durations between 20 ns and 200 ns.

34. The position-measuring device according to claim 33, further comprising a scanning unit movable relative to a measuring standard, the light source being arranged remotely from the scanning unit, the light source connected to the scanning unit by an optical fiber.

35. The position-measuring device according to claim 1, wherein the partial-beam paths are arranged asymmetrically with different optical path lengths which are traversed by partial beams of rays before the partial beams of rays, superimposed, come to interference.

36. The position-measuring device according to claim 1, wherein the position-measuring device is arranged as an interferometer.

37. The position-measuring device according to claim 1, wherein the light source including the semiconductor laser and the fiber-grating feedback device is adapted to operate in pulsed manner to avoid and/or minimize measuring inaccuracies that result from storage jitter.

38. The position-measuring device according to claim 1, wherein a reflection characteristic of the fiber-grating feedback device is matched, in terms of wavelength, to a mode spacing of the semiconductor laser.

39. The position-measuring device according to claim 38, wherein the fiber-grating feedback device is adapted to reflect back into the semiconductor laser radiation in a wavelength range that is smaller than a spacing between adjacent modes of the semiconductor laser.

\* \* \* \* \*